United States Patent [19]

Giron

[11] Patent Number: 4,480,671
[45] Date of Patent: Nov. 6, 1984

[54] TREAD AND HEAVY DUTY TIRE
[75] Inventor: Daniel G. Giron, Greer, S.C.
[73] Assignee: Michelin Recherche et Technique S.A., Basel, Switzerland
[21] Appl. No.: 371,666
[22] Filed: Apr. 26, 1982
[51] Int. Cl.³ .............................................. B60C 11/06
[52] U.S. Cl. ............................ 152/209 R; D12/141; D12/152
[58] Field of Search .......... 152/209 R, 209 D, 209 A; D12/140, 141, 142, 152

[56] References Cited

U.S. PATENT DOCUMENTS

| 3,782,438 | 1/1974 | Mirtain | 152/209 R |
| 4,214,618 | 7/1980 | Takigawa et al. | D12/142 |
| 4,262,721 | 4/1981 | Tadokoro et al. | 152/209 R |
| 4,262,722 | 4/1981 | Takigawa et al. | 152/209 R |
| 4,282,914 | 8/1981 | Takigawa et al. | 152/209 D |

FOREIGN PATENT DOCUMENTS 1480918 3/1969 Fed. Rep. of Germany .
2818071 11/1978 Fed. Rep. of Germany .
2037677 7/1980 United Kingdom .

Primary Examiner—Michael Ball
Attorney, Agent, or Firm—Brumbaugh, Graves, Donohue & Raymond

[57] ABSTRACT

A tread for a belted radial tire for transport vehicles comprises in each of its two lateral zones a narrow substantially circular circumferential groove defining a lateral rib, the meridian profile of the lateral rib being substantially parallel to and inward of the meridian profile of the geometrical envelope of the principal median zone of the tread and the width of the lateral rib at its crown being at most equal to the maximal depth of the narrow groove.

6 Claims, 7 Drawing Figures

TREAD AND HEAVY DUTY TIRE

The present invention relates to an improvement in treads and heavy duty tires; more particularly, it relates to treads and radial tires intended for the nondriving axles of transport vehicles, such as trucks, delivery trucks, buses, etc.

The tires presently used on these axles, consisting primarily of the steering axles at the front of these transport vehicles, generally have a tread whose meridian or transverse profile has rounded edges in order to provide good handling on dry ground and, in particular, in order to avoid the "rail effect" (See below), and a sculptured tread pattern comprising a plurality of circumferential grooves in order to have good transverse adherence.

In order to improve the transverse adherence of these tires by the tread pattern, the number of circumferential grooves can be increased but one is limited by the decrease in the resistance to wear of the tread; the ribs between two grooves become too narrow and are then sensitive to irregular forms of wear. It is also possible to produce a tread having sharp non-rounded edges, but there then becomes evident the defect in handling known by the name of "rail effect" or "wandering phenomenon": when the vehicle must pass over a longitudinal ridge on the ground, the driver has the feeling of suddenly leaving guide rails since he must swing the steering wheel through a large angle, which then shifts the vehicle transversely; it is in order to avoid this drawback that the shoulders of these tires are rounded.

However, in his continuing search for greater safety, the applicant has desired to improve further the transverse adherence of the steering tires for transport vehicles.

In order to do this, he has sought to employ the favorable effect of the addition of circumferential grooves and to create a sharp edge at the sides of the tread while eliminating their drawbacks (irregular wear and rail effect).

In accordance with the present invention, a tread for a tire for transport vehicles, the tire comprising a tread, two sidewalls and two beads, a radial carcass reinforcement and a tread reinforcement formed of at least two plies of wires or cables parallel in each ply and crossed from one ply to the next, is characterized by the fact that the tread comprises in each of its two lateral zones a narrow substantially circular circumferential groove defining a lateral rib, the meridian profile of the lateral rib being substantially parallel to and inward of the meridian profile of the geometrical envelope of the principal median zone of the tread and the width of the lateral rib at its crown being at most equal to the maximal depth of the narrow groove.

The circumferential groove in accordance with the present invention is sufficiently narrow so that, when making a turn, the lateral rib which is on the outer side of the turn comes against the principal median zone of the tread: it has a width of between 0.5% and 4% (preferably 1.5%) of the width of the tread; this narrow groove is substantially circular or straight, that is to say its distance from the equatorial plane of the tire is substantially constant.

In accordance with the present invention, the difference in level between the lateral ribs and the principal median zone of the tread is sufficiently small so that, under normal conditions of travel (pressure, load, etc.), the lateral ribs come into contact with the ground: this difference in level is between 40% and 200% of the deflection, under load, of the tread, i.e., the radial deformation which the part of the tread radially outward of the tread reinforcement has to sustain during its contact with the ground under normal conditions of travel.

The present invention provides several advantages:

It makes it possible to introduce a new sharp sculptured edge A (See FIGS. 1 and 2) very close to the side of the tread. This sharp edge applies itself against the ground with very great pressure since it is in relief as compared with the lateral rib, which leads to the creation of a barrier which makes it possible to expel the water and therefore to have good contact between the tire and the ground;

This geometry of the tread pattern has the feature of retaining its effectiveness throughout the life of the tire. As a matter of fact, the difference in level between the lateral ribs and the principal median zone of the tread is maintained for the entire life of the tread. The phenomenon involved is well known: sculptured tread elements which exert a lower pressure on the ground have larger relative movements with respect to the ground and therefore become worn more rapidly due to rubbing until the time when the difference in level is such that there is an equalization of the rates of wear between relief elements and recessed elements, the latter being only in very slight or intermittent contact with the ground.

Upon turns, the lateral rib which is on the outer side of the turn comes against the side of the principal median zone of the tread; in other words, the narrow circumferential groove in accordance with the invention is closed, thus protecting the sharp edge A from rapid wear and creating a solid shoulder with rounded edge as necessary for good handling and the absence of rail effect.

Referring to the accompanying drawing, a non-limitative embodiment of the invention will now be described.

Figure 1:
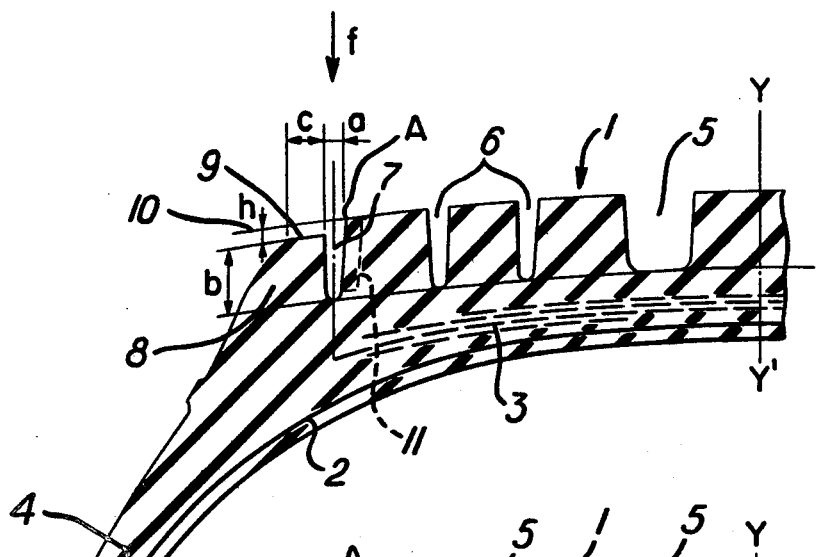
FIG. 1 is a meridian (transverse) cross-section view through half of a tread in accordance with the present invention.

FIG. 1 shows half of the tread 1 of a tire with a radial carcass reinforcement 2 and a tread reinforcement 3 formed of four plies of wires or cables parallel in each ply and crossed from one ply to the next. The equatorial plane of the tire is Y-Y'.

The tread 1 is extended on each side by a sidewall 4 which is thinner and more flexible. In known manner, this tread 1 has circumferential grooves, such as 5 and 6 which may be of different width and of circular, undulated or zigzag course and may or may not be connected by transverse grooves.

In accordance with the present invention, in the lateral zone of the tread 1 a narrow substantially circular circumferential groove 7 defines a lateral rib 8 whose meridian profile 9 is substantially parallel to and inward of the meridian profile 10 of the geometrical envelope of the principal median zone of the tread 1.

The example described concerns a radial tire of size 11R 22.5 whose tread has a width of 200 mm.

The narrow groove 7 has a width $a=3$ mm, namely 1.5% of the width of the tread 1. The difference in level between the meridian profile 9 of the lateral rib 8 and the meridian profile 10 of the geometrical envelope of the principal median zone of the tread 1 is $h=2.5$ mm, namely 120% of the deflection, under load, of the tread 1.

The lateral rib 8 has a width at its crown $c=7$ mm; it is noted that the width c is less than the maximal depth $b+h=15$ mm of the narrow groove 7. Furthermore, the maximal depth of the narrow groove 7 is substantially the same as the depth (15 mm) of the other circumferential grooves 5 and 6 of the tread 1.

Figure 2:
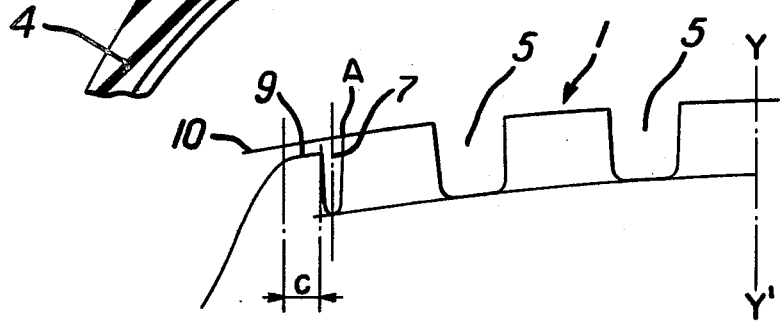
FIG. 2 is a meridian cross-section view through half of another tread in accordance with the present invention.

FIG. 2 shows a meridian cross-section through half of another tread in accordance with the present invention in which the circumferential grooves 5 of the principal median zone of the tread are all wide.

Figure 3A:
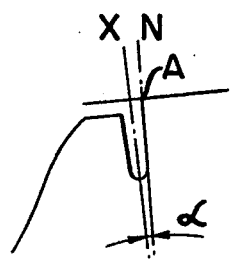
FIGS. 3A, 3B and 3C are meridian cross-section views through the lateral zones of variant embodiments of the tread having a non-sharp, sloping shoulder to decrease rail effect in accordance with the present invention.
Figure 3B:
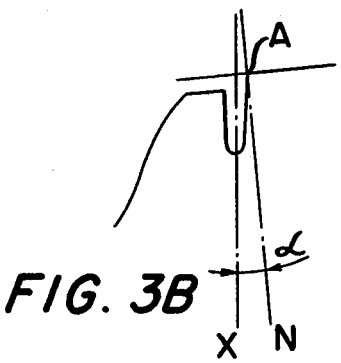
Figure 3C:
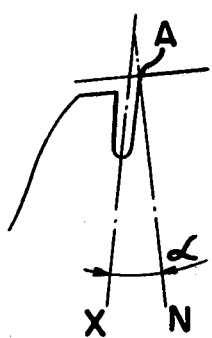

The meridian cross-sections in FIGS. 3A, 3B and 3C show the angle $\alpha$ which the axis X of the cross-section of the narrow groove 7 makes with the normal N to the surface or crown of the tread 1 at the point of intersection of the sharp edge A and the sectional plane. As shown here, this angle $\alpha$ may assume different positive or negative values in order to optimize the contact pressure with the ground of the rib containing the sharp edge A in the vicinity of that sharp edge A.

Figure 4:
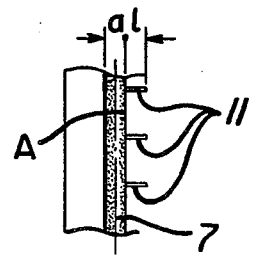
FIGS. 4 and 5 are plan views in the direction of arrow F (FIG. 1) of the narrow circumferential groove of the tread in accordance with the present invention.
Figure 5:
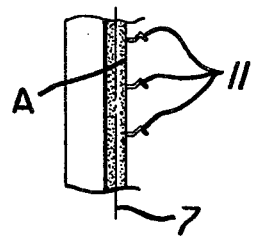

In a variant of the present invention, as shown in FIGS. 4 and 5 (and FIG. 1), the wall of the narrow groove 7 on the side towards the middle of the tread has small radial sipes 11 of a length $\alpha$ and depth substantially equal to the width a and maximal depth, respectively, of the narrow groove 7. These sipes 11 have the function of favoring the breaking up of the film of water between the ground and the rib having the sharp edge A. They may have a rectilinear course (FIG. 4) or a broken-line course (FIG. 5).

In another variant (not shown) of the present invention, the tread reinforcement 3 has an axial width greater than that of the principal median zone of the tread 1, i.e., the tread reinforcement 3 extends in the axial direction below a part of the lateral rib 8 in order to impart to the rib having the sharp edge A greater rigidity when it comes into contact with the ground.

What is claimed is:

1. A tread for a non-driving axle tire for transport vehicles, the tire comprising a tread, two sidewalls and two beads, a radial carcass reinforcement and a tread reinforcement formed of at least two plies of wires or cables parallel in each ply and crossed from one ply to the next, characterized by the fact that the tread comprises in each of its two lateral zones a narrow, substantially circular circumferential groove defining a lateral rib, said narrow groove having a width of between 0.5% and 4% of the width of the tread and said lateral rib having a sloping shoulder, the meridian profile of the lateral rib being substantially parallel to and inward of the meridian profile of the geometrical envelope of the principal median zone of the tread, said principal median zone having a sharp, non-rounded edge where it intersects the tread surface, the sharp edge being maintained during the life of the tire by the lateral rib, the width of the lateral rib at its crown being at most equal to the maximum depth of the narrow groove, and the difference in level between the meridian profile of the lateral rib and the meridian profile of the geometrical envelope of the principal median zone of the tread is such that under normal conditions of travel both the lateral rib and the principal median zone are in contact with the ground and the ground contact pressure of the former is less than the ground contact pressure of the latter, whereby said lateral rib and principal median zone wear at rates resulting in the maintenance of said difference in level during the life of the tire.

2. A tread according to claim 1, characterized by the fact that the difference in level between the meridian profile of the lateral rib and the meridian profile of the geometrical envelope of the principal median zone of the tread is between 40% and 200% of the deflection, under load, of the tread, i.e., the radial deformation which the part of the tread radially outward of the tread reinforcement has to sustain during its contact with the ground under normal conditions of travel.

3. A tread according to claim 2, characterized by the fact that the maximal depth of the narrow groove is substantially the same as the depth of the other circumferential grooves of the tread.

4. A tread according to claim 3, characterized by the fact that the narrow groove has in its wall on the side towards the middle of the tread small radial sipes of a length and depth substantially equal to the width and maximal depth, respectively, of the narrow groove.

5. A tire for transport vehicles comprising a tread, two sidewalls and two beads, a radial carcass reinforcement and a tread reinforcement formed of at least two plies of wires or cables parallel in each ply and crossed from one ply to the next, characterized by the fact that the tread is the tread according to claim 1 or 2 or 3 or 4.

6. A tire for transport vehicles according to claim 5, characterized by the fact that the tread reinforcement has an axial width greater than that of the principal median zone of the tread.

* * * * *

UNITED STATES PATENT AND TRADEMARK OFFICE
CERTIFICATE OF CORRECTION

PATENT NO. : 4,480,671

DATED : November 6, 1984

INVENTOR(S) : Daniel G. Giron

It is certified that error appears in the above—identified patent and that said Letters Patent is hereby corrected as shown below:

Col. 3, line 37, "length $\alpha$" should read -- length $\ell$ --.

Signed and Sealed this

Thirtieth Day of April 1985

[SEAL]

Attest:

DONALD J. QUIGG

*Attesting Officer*     *Acting Commissioner of Patents and Trademarks*